United States Patent
Lee

(10) Patent No.: US 7,924,787 B2
(45) Date of Patent: Apr. 12, 2011

(54) METHOD AND APPARATUS FOR CONTROLLING SCANNING PERIOD IN A MOBILE COMMUNICATION TERMINAL

(75) Inventor: Byoung-Chul Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1237 days.

(21) Appl. No.: 11/513,852

(22) Filed: Aug. 31, 2006

(65) Prior Publication Data

US 2007/0091847 A1 Apr. 26, 2007

(30) Foreign Application Priority Data

Oct. 24, 2005 (KR) .................. 10-2005-0100240

(51) Int. Cl.
*H04W 4/00* (2009.01)
(52) U.S. Cl. .................................................. 370/331
(58) Field of Classification Search .............. 370/331, 370/338
See application file for complete search history.

(56) References Cited

U.S. PATENT DOCUMENTS

| 6,768,944 | B2* | 7/2004 | Breed et al. ............ 701/301 |
| 7,542,728 | B2* | 6/2009 | Bitran et al. ............ 455/73 |
| 7,545,787 | B2* | 6/2009 | Bitran et al. ............ 370/338 |
| 2004/0147267 | A1* | 7/2004 | Hill et al. ............ 455/456.1 |
| 2008/0215202 | A1* | 9/2008 | Breed ............ 701/25 |
| 2009/0122760 | A1* | 5/2009 | Kim et al. ............ 370/331 |

* cited by examiner

*Primary Examiner* — Diane Mizrahi
(74) *Attorney, Agent, or Firm* — The Farrell Law Firm, P.C.

(57) ABSTRACT

A method and an apparatus for controlling a WLAN scanning period using a velocity sensor in a mobile communication terminal are provided. The velocity of a user is measured at a predetermined period and it is determined whether the measured velocity satisfies a predetermined condition for changing the scanning period. A scanning period corresponding to the velocity is detected in a look-up table, if the velocity satisfies the predetermined condition. Scanning is performed at the detected scanning period.

6 Claims, 3 Drawing Sheets

METHOD AND APPARATUS FOR CONTROLLING SCANNING PERIOD IN A MOBILE COMMUNICATION TERMINAL

PRIORITY

This application claims the benefit under 35 U.S.C. § 119(a) to a Korean Patent Application filed in the Korean Intellectual Property Office on Oct. 24, 2005 and assigned Ser. No. 2005-100240, the contents of which are incorporated herein by reference.

BACKGROUND OF THE INVENTION

1. Field of the Invention

The present invention relates generally to a mobile communication terminal, and in particular, to a method and apparatus for controlling a Wireless Local Area Network (WLAN) scanning period using a velocity sensor in a mobile communication terminal.

2. Description of the Related Art

The growth of applications requiring increased bandwidths in a mobile communication system, such as a video call and connection to the mobile Internet, is a driving force behind increasing the demand for mobile communication terminals equipped with an Institute Electrical and Electronics Engineers (IEEE) 802.1x WLAN device.

In addition, the functionality of supporting voice call in a cellular terminal using the WLAN device over a WLAN has already been deployed. As a consequence, users can enjoy voice calls with almost the same quality at a low charge rate over the WLAN at places with WLAN Access Points (APs), instead of a cellular network.

In the meantime, along with the development of a velocity sensor for sensing the actions and movements of a user, various applications utilizing velocity sensors are under active development for use in mobile terminals.

The mobile communication terminal may access the WLAN in two ways: manual connection and automatic connection. In the manual connection mode, the mobile communication terminal scans for a neighbor AP to thereby access the WLAN, upon user request, while in the automatic connection mode, the mobile communication terminal periodically scans for a neighbor AP irrespective of the user's request, and when an AP is detected, it automatically connects to the WLAN. In view of the mobility of the mobile communication terminal, when a voice call is placed over the WLAN, handover may occur between a WLAN AP and a cellular network or between WLAN APs. Thus, during the call or during camp-on, the mobile communication terminal needs to scan for a neighbor AP periodically.

However, AP scanning is quite a constraint in terms of current consumption closely related to battery lifetime in the mobile communication terminal, and more current is consumed with a shorter scanning period. If the scanning period is lengthened to reduce current consumption, AP detection takes a long time. Especially in the case of handover to another AP during a call over a wireless network, a time delay occurs to detection of a target AP, thereby significantly decreasing communication quality.

SUMMARY OF THE INVENTION

An object of the present invention is to substantially solve at least the above problems and/or disadvantages and to provide at least the advantages below. Accordingly, an object of the present invention is to provide a method of controlling a WLAN scanning period using a velocity sensor in a mobile communication terminal.

Another object of the present invention is to provide a method of reducing current consumption for discovery of a wireless network by controlling the scanning period of a WLAN device using a velocity sensor in a mobile communication terminal equipped with both the WLAN device and the velocity sensor.

The above objects are achieved by providing a method of controlling a WLAN scanning period using a velocity sensor in a mobile communication terminal.

In the WLAN scanning period controlling method, the velocity of a user is measured at a predetermined period and it is determined whether the measured velocity satisfies a predetermined condition for changing the scanning period. A scanning period corresponding to the velocity is detected in a look-up table, if the velocity satisfies the predetermined condition. Scanning is performed at the detected scanning period.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention provides a method of controlling a WLAN scanning period using a velocity sensor in a mobile communication terminal. APs are mostly fixed in a WLAN and always kept on. Therefore, as long as the mobile communication terminal is stationary, there is not the least possibility that a new AP is discovered or the present AP disappears. In this context, the movement of a user is monitored. When the user moves, the WLAN is scanned for a short period, while when the user is stationary, the WLAN is scanned for a long period, to thereby save power for discovery of a wireless network.

Figure 1:
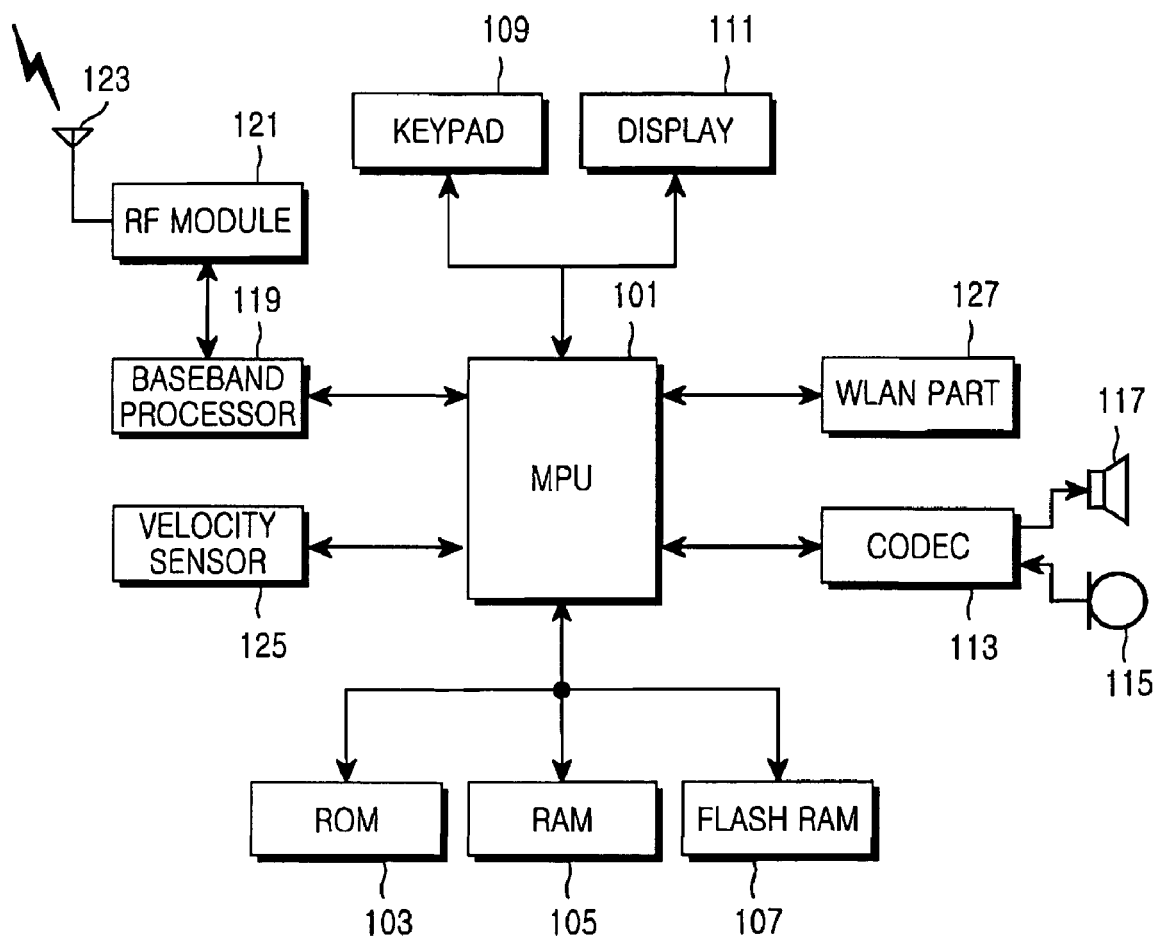
FIG. 1 is a block diagram of a mobile communication terminal according to the present invention.

FIG. 1 is a block diagram of a mobile communication terminal according to the present invention. The mobile communication terminal can be any of, but is not limited to, a cellular phone, a Personal Communication System (PCS) phone, a Personal Data Assistant (PDA), and an International Mobile Telecommunication-2000 (IMT-2000) terminal. The following description is made of a configuration common to the above terminals.

Referring to FIG. 1, a Micro-Processor Unit (MPU), acting as a controller, 101 provides overall control to the operation of the mobile communication terminal. For example, the MPU 101 processes and controls voice and data communications.

In addition to the typical functionality, the MPU 101 controls a WLAN scanning period using a velocity sensor according to the present invention. Thus, a description of the typical processes and control operations of the MPU 101 will not be described herein.

A Read Only Memory (ROM) 103 stores the micro-codes of programs for the processes and control operations of the MPU 101, and various reference data. In particular, the ROM 103 stores a program for controlling the WLAN scanning period using the velocity sensor according to the present invention. A Random Access Memory (RAM) 105 serves as a working memory for the MPU 101, for storing temporary data generated during execution of programs. According to the present invention, the RAM 105 preserves a look-up table in which scanning period values are mapped to the velocities of the mobile communication terminal. A Flash RAM 107 stores various updatable data to be kept, such as a phone book, an outgoing message and an incoming message. Read Only Memory (ROM) 103, Random Access Memory (RAM) 105 and Flash RAM 107 collectively can be referred as a memory.

A keypad 109 is provided with alphanumerical keys and function keys including Menu, Cancel (Clear), OK, Talk, End, Internet, and navigation keys (or directional keys, ▲/▼/ □/□). The keypad 109 provides key input data corresponding to a user-pressed key to the MPU 101. Particularly, the keypad 109 generates an electrical signal identifying the position of a pressed key and provides it to the MPU 101 according to the present invention.

A display 111 displays status information generated during the operation of the mobile communication terminal, a limited number of characters, moving pictures, and still images. The display 111 may be implemented using a Liquid Crystal Display (LCD).

A Coder-Decoder (CODEC) 113 connected to the MPU 101, and a speaker 117 and a microphone 115 connected to the CODEC 113 collectively form a voice input/output block for use in voice call and voice recording. The CODEC 113 converts digital data received form the MPU 101 to an analog voice signal and outputs the analog voice signal through the speaker 117. The CODEC 113 also converts a voice signal received through the microphone 115 to digital data and provides the digital data to the MPU 101.

A Radio Frequency (RF) module 121 downconverts an RF signal received through an antenna 123 to a baseband signal and provides the baseband signal to a baseband processor 119. The RF module 121 also upconverts a baseband signal received from the baseband processor 119 to an RF signal and sends the RF signal through the antenna 123. The baseband processor 119 processes baseband signals between the RF module 121 and the MPU 101. For transmission, the baseband processor 119 channel-encodes and spreads data and for reception, it despreads and channel-decodes a received signal.

A velocity sensor 125, activated by a velocity sensor handler software, monitors the movement and velocity of the mobile communication terminal at every predetermined period and reports the monitoring result to a WLAN part 127 in a movement report message via the MPU 101.

The WLAN part 127, activated by a WLAN driver software, scans the WLAN at every scanning period. In addition to its typical functionalities, the WLAN part 127 analyzes the movement report message and controls the WLAN scanning period according to a programmed condition.

Figure 2:
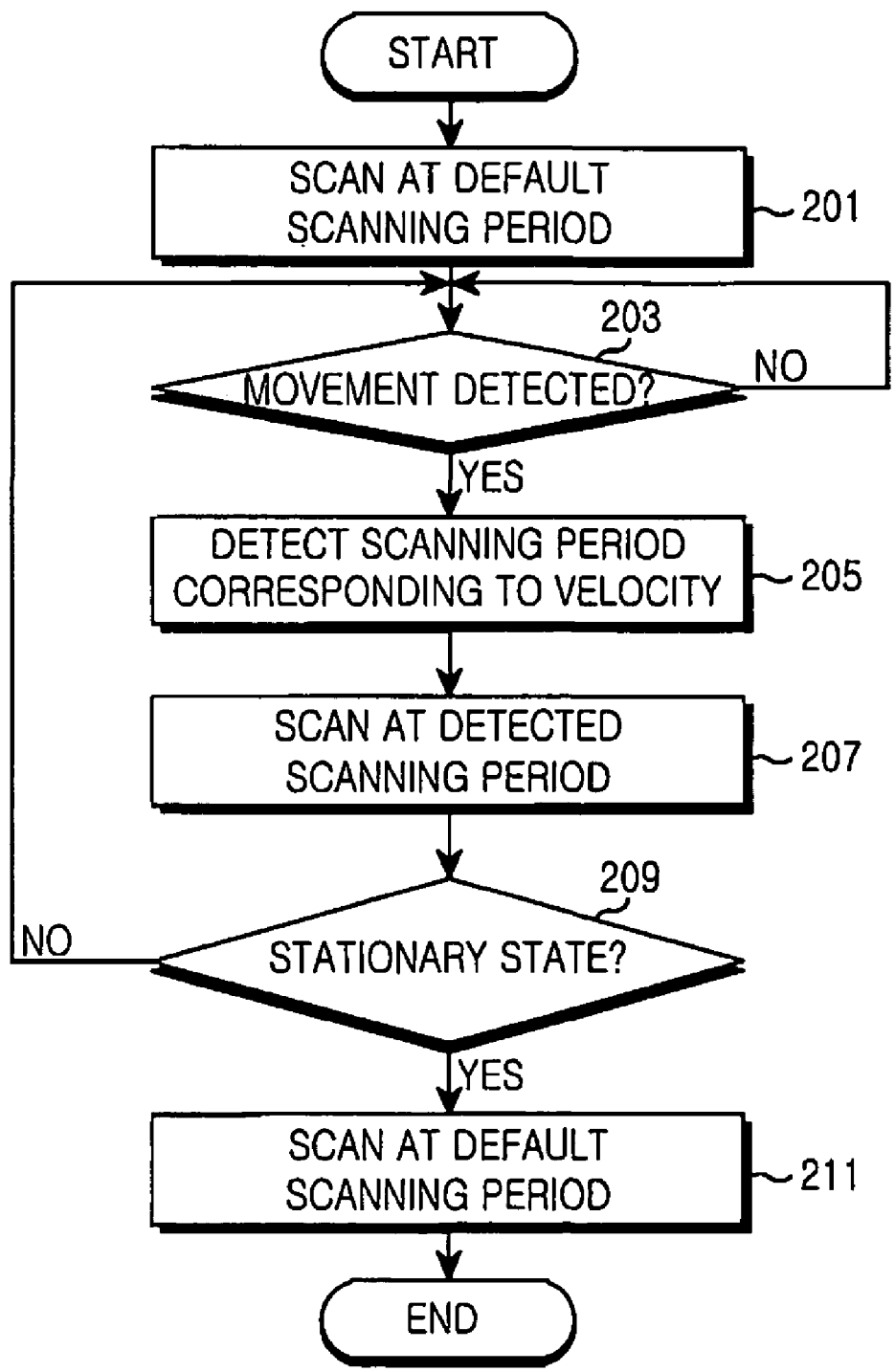
FIG. 2 is a flowchart illustrating an operation for controlling a WLAN scanning period using a velocity sensor in the mobile communication terminal according to the present invention.

FIG. 2 is a flowchart illustrating an operation for controlling the WLAN scanning period using the velocity sensor in the mobile communication terminal according to the present invention.

Referring to FIG. 2, the MPU 101 monitors the movement and velocity of the mobile communication terminal using the velocity sensor and scans at a default scanning period α[0] by activating the WLAN driver software on the assumption that the movement of the mobile communication terminal has not yet been detected in step 201. α[0] is set to a substantially large number.

In step 203, the MPU 101 determines at every predetermined period T_move_det whether the mobile communication terminal is moving. Specifically, the velocity sensor 125 monitors the movement and velocity of the mobile communication terminal at every predetermined period. Upon detection of the movement, it reports the monitoring result to the WLAN part 127 by a movement report message via MPU 101.

The MPU 101 or the WLAN part 127 determines based on the movement report message whether the user movement satisfies a predetermined condition for changing the scanning period. The WLAN part 127 may be included in the MPU 101. In this case, the MPU 101 including the WLAN part 127 may be referred to as a controller. The determination is made according to a condition preset to avoid too frequent scanning. The condition may be defined as a certain velocity for a certain period of time. For example, the condition is 4 Km/h or faster for 3 seconds.

In step 205, the MPU 101 searches for a scanning period α[n] corresponding to the velocity, referring to the look-up table of the memory 105 and updates the scanning period of the WLAN part 127 with the searched scanning period. α[n] is smaller than α[0] so that the WLAN 127 can scan more often.

The above condition may be defined as a threshold velocity. In this case, if the velocity is greater than the threshold velocity, identifying a scanning period corresponding to the velocity in a look-up table is performed in step 205.

The MPU 101 scans a neighbor AP at the updated scanning period in step 207.

In step 209, the MPU 101 determines whether the user has stopped moving. As with the movement deciding condition, the stationary state of the user can be defined as movement at a predetermined speed or slower for a predetermined time period. If the user is still moving, the MPU 101 returns to step 203 and continues to monitor the movement of the user at the period T_move_det. On the other hand, if the user has stopped, the MPU 101 scans at the default scanning period α[0] in step 211 and then ends the process of the present invention.

Figure 3:
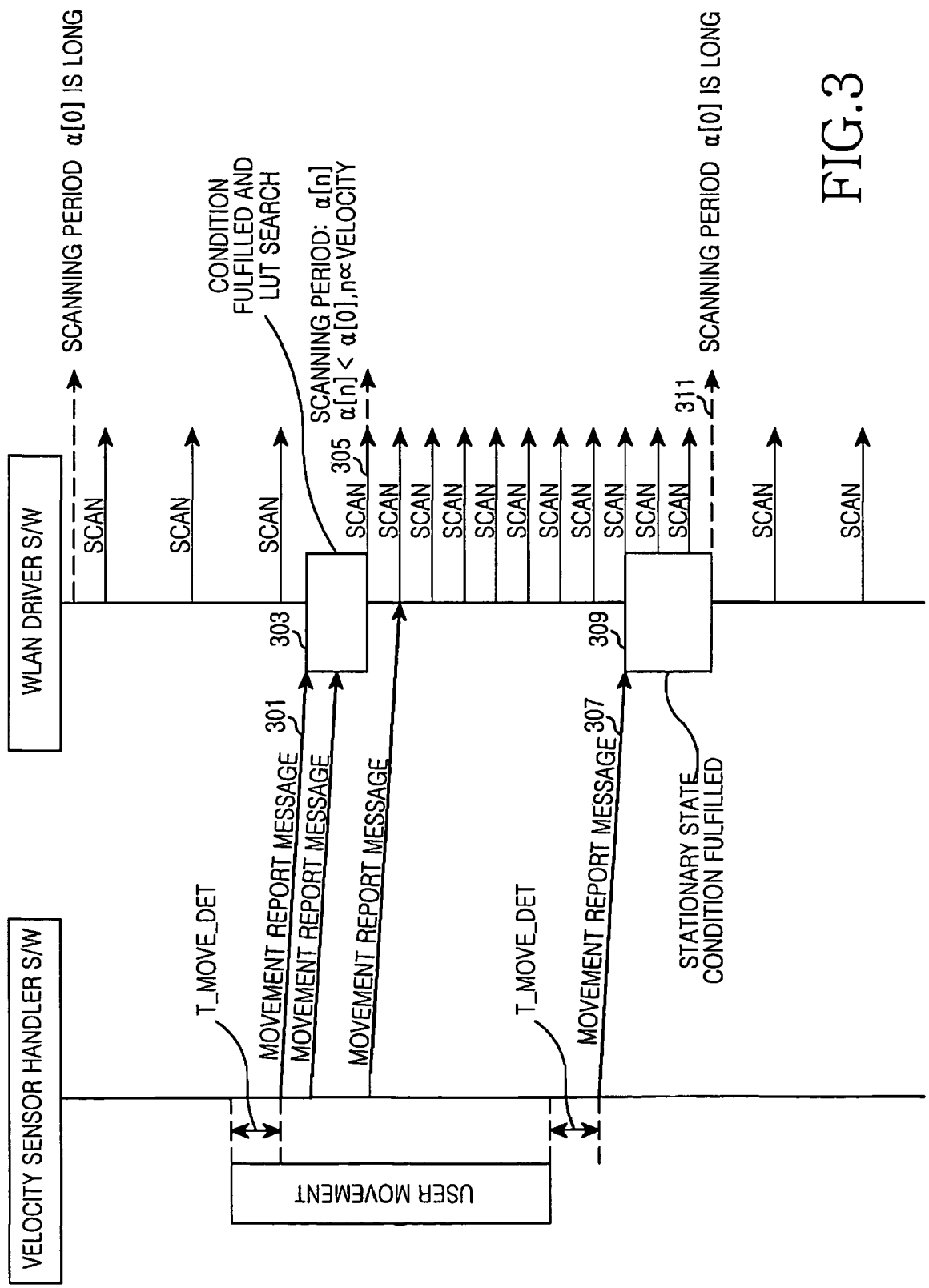
FIG. 3 illustrates an exemplary WLAN scanning period control in the mobile communication terminal according to the present invention.

FIG. 3 illustrates an exemplary WLAN scanning period control in the mobile communication terminal according to the present invention.

Referring to FIG. 3, the velocity sensor 125 monitors the movement of the user at the predetermined period T_move_det and the WLAN part 127 scans at the default scanning period α[0]. Upon detection of the movement, the velocity sensor 125 reports the velocity of the user to the WLAN part 127 by a movement report message in step 301. The WLAN part 127 determines whether the user is moving according to a condition preset to avoid too frequent scanning.

That is, upon receipt of a movement report message indicating that the user is moving at a predetermined velocity or faster for a predetermined time, the WLAN part 127 determines that the user is moving and detects a scanning period, scan_period corresponding to the velocity of the user in the look-up table in step 303.

After updating the scanning period with the detected scanning period, the WLAN part 127 more often scans for a neighbor AP at the updated scanning period in step 305.

Upon receipt of a movement report message indicating that the user has moved at or below a predetermined velocity for a predetermined time from the velocity sensor 125, that is, satisfying a stationary state condition, the WLAN part 127 determines that the user is no longer moving and scans at the default scanning period α[0] in step 311.

As described above, the present invention controls the scanning period of a WLAN device using a velocity sensor in the mobile communication terminal equipped with the WLAN device and the velocity sensor, so that scanning is carried out more often only when a new AP is discovered or the user is highly probable to get out of the coverage area of the existing camped-on AP.

Consequently, the battery life of a mobile communication terminal is lengthened, its mobility is ensured to enable fast handover, and a call can be conducted with the same quality as if the call were made in a conventional manner. While power is additionally taken to activate the velocity sensor, the power consumption is very low as compared with power taken for frequent scanning. Therefore, power is saved for discovery of a wireless network on the whole.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of controlling a scanning period using a velocity sensor in a mobile communication terminal, comprising the steps of:
    measuring, by a velocity sensor, a velocity of the mobile communication terminal;
    determining, by a controller, whether the measured velocity is greater than a threshold velocity;
    scanning at a default scanning period, if the velocity is not greater than the threshold velocity;
    identifying, by the controller, a scanning period corresponding to the velocity in a look-up table, if the velocity is greater than the threshold velocity; and
    scanning, by the controller, a neighboring access point of a wireless local area network at the identified scanning period.

2. The method of claim 1, wherein the default scanning period is shorter than scanning periods in the look-up table.

3. The method of claim 1, wherein the measuring step is performed at a predetermined period.

4. A mobile communication terminal for controlling a scanning period using a velocity sensor comprising:
    a memory for storing a look-up table; and
    a controller for measuring a velocity of the mobile communication terminal, determining whether the measured velocity is greater than a threshold velocity, scanning at a default scanning period, if the velocity is not greater than the threshold velocity, identifying a scanning period corresponding to the velocity in the look-up table, if the velocity is greater than the threshold velocity, and scanning a neighboring access point of a wireless local area network at the identified scanning period.

5. The mobile communication terminal of claim 4, wherein the default scanning period is shorter than scanning periods in the look-up table.

6. The mobile communication terminal of claim 4, wherein the controller performs the measuring step at a predetermined period.

* * * * *